No. 837,855. PATENTED DEC. 4, 1906.
F. A. LAW.
ANTIJOUNCING APPLIANCE.
APPLICATION FILED OCT. 23, 1905.
2 SHEETS—SHEET 1.
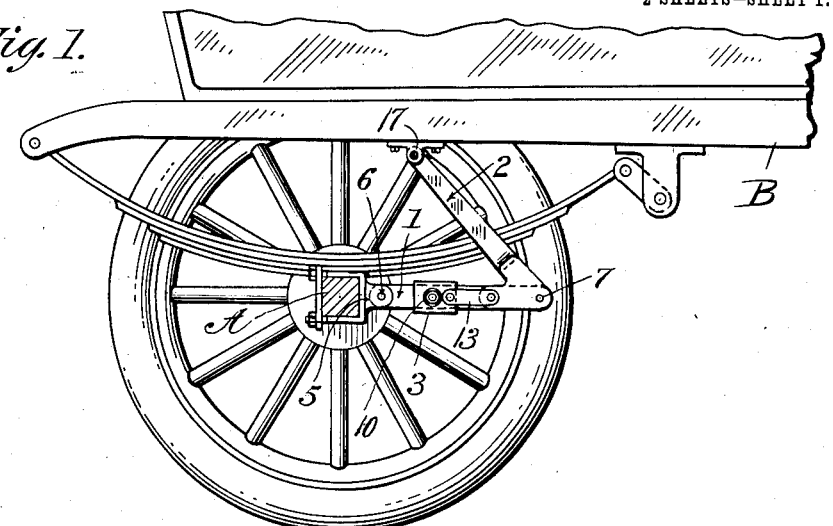
Fig. 1.
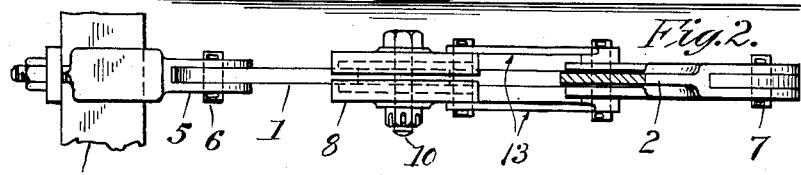
Fig. 2.
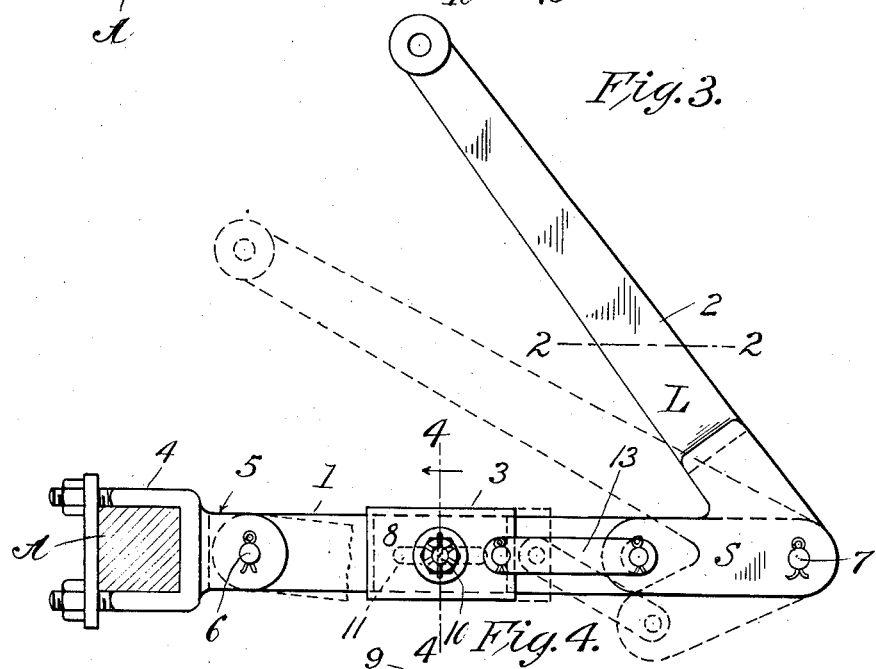
Fig. 3.
Fig. 4.
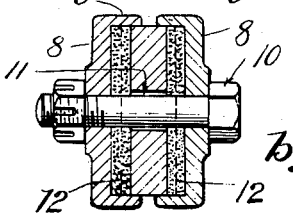
Witnesses:
H. L. Sprague
E. L. Smith
Inventor.
Fred A Law
by Chapin & Leo
Attorneys.

No. 837,855. PATENTED DEC. 4, 1906.
F. A. LAW.
ANTIJOUNCING APPLIANCE.
APPLICATION FILED OCT. 23, 1905.

2 SHEETS—SHEET 2.

Witnesses.
H. L. Sprague
E. L. Smith

Inventor:
Fred A. Law
by Chapin & Co.
Attorneys.

UNITED STATES PATENT OFFICE.

FRED A. LAW, OF HARTFORD, CONNECTICUT.

ANTIJOUNCING APPLIANCE.

No. 837,855.  Specification of Letters Patent.  Patented Dec. 4, 1906.

Application filed October 23, 1905. Serial No. 283,988.

*To all whom it may concern:*

Be it known that I, FRED A. LAW, a citizen of the United States of America, residing at Hartford, in the county of Hartford and State of Connecticut, have invented new and useful Improvements in Antijouncing Appliances, of which the following is a specification.

This invention relates to that type of appliances or devices designed to absorb and neutralize the shock of opposing forces, especially in connection with the running-gear and bodies of vehicles, and to this end the invention has in view a novel and practical construction of antijouncing appliance for vehicles.

The invention possesses special utility in connection with motor-vehicles which while in rapid motion upon rough roads subject the occupants to a severe jouncing, occasioned by the severe vibration which is imparted to the body of the vehicle through the action of the supporting-springs for the vehicle-body.

The violent up-and-down jolting motion under the conditions above referred to is not only a very disagreeable and objectionable feature of automobiling, but also subjects the vehicle and motor to abnormal shocks, jars, and strains, which seriously affect the durability and stability of the machine.

It is the purpose of the present invention to entirely obviate these objections through the employment of an appliance embodying simple and thoroughly effective means for absorbing and cushioning the shocks and jars incident to the quick spring action occasioned by a vehicle traveling over rough roads and at high speed.

With these and other objects in view, which will more readily appear as the nature of the invention is better understood, the same consists in the novel construction, combination, and arrangement of parts hereinafter more fully described, illustrated, and claimed.

Figure 5:
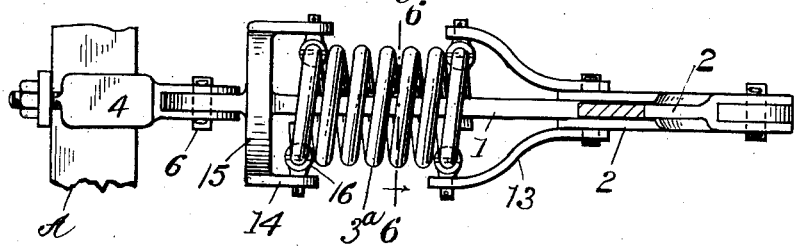
Figure 6:
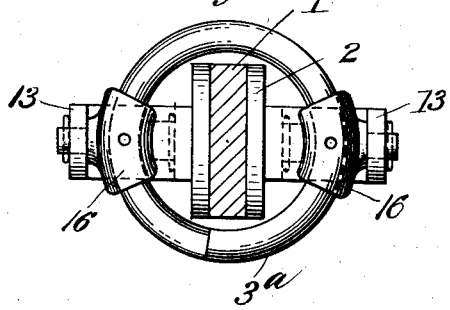
Figure 7:
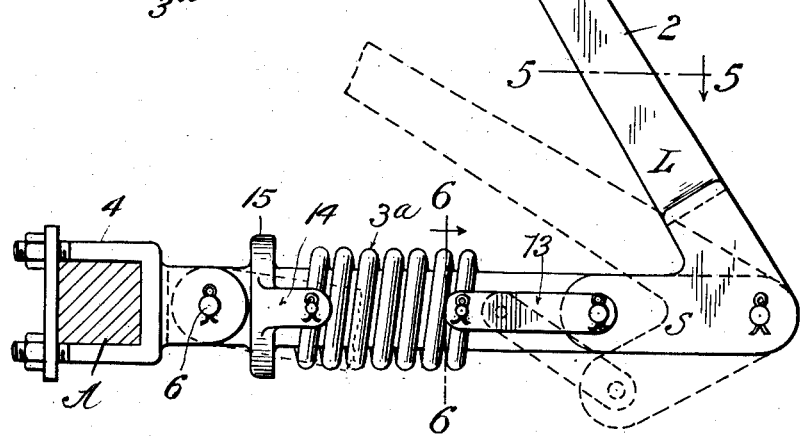

In the accompanying drawings, Figure 1 is a side view of an antijouncing appliance constructed in accordance with the present invention and shown applied to a vehicle of the motor type. Fig. 2 is an enlarged plan view, partly in section, of the appliance, the line of section being indicated by the line 2 2 in Fig. 3. Fig. 3 is an enlarged detail view of the complete appliance or device disconnected from the vehicle. Fig. 4 is a detail cross-sectional view on the line 4 4 of Fig. 3, showing one form of buffer device for the appliance. Fig. 5 is a view similar to Fig. 2, showing a modified construction. Fig. 6 is a cross-sectional view on the line 6 6 of Fig. 5. Fig. 7 is a view similar to Fig. 3, showing in elevation a modified form of appliance illustrated in Figs. 5 and 6.

Like references designate corresponding parts in the several figures of the drawings.

In carrying out the present invention the antijouncing appliance essentially comprises in its general organization three principal elements—namely, a fulcrum-bar 1, a checking-lever 2, and a buffer device 3, operatively related to the said bar and lever and affording what may be termed a "braking" connection between the said elements, whereby the checking-lever will receive and effectually check the jars and vibrations incident to the up-and-down vibrations of the vehicle-body.

The fulcrum-bar 1 preferably consists of a straight flat bar designed to be pivotally supported at one end upon a fixed point of adjustment on the running-gear of the vehicle. Usually this is accomplished by employing an axle-clip 4, bolted fast to the axle A of the vehicle and provided with an offstanding bifurcated hanger-ear 5, in which is pivotally supported or mounted one end of the fulcrum-bar by means of a pivot pin or bolt 6. The opposite vertically-swinging end of the fulcrum-bar is pivotally connected by means of the pivot pin or bolt 7 to the vertically-swinging check-lever 2. In its preferable construction this checking-lever is in the form of a bell-crank consisting of the long and short arms L and S, respectively, and the short arm and angle portion of the said lever is usually bifurcated to receive the swinging end of the fulcrum-bar 1 and to maintain a properly-centered relation thereto. The pivotal connection 7 between the fulcrum-bar and the checking-lever 2 is located at the angle of the latter and constitutes a shifting or moving fulcrum for the same.

As indicated, the distinctive feature of the invention resides in providing a braking connection between the checking-lever and its swinging fulcrum 1. This braking connection preferably consists of a buffer device comprising means for absorbing and cushioning the jars and jolts to which the vehicle-body may be subjected. Various types of buffer devices may be utilized for these purposes; but one of the preferred constructions is shown in Figs. 1 to 4, inclusive, of the drawings. In this construction the buffer device 3 essentially comprises a pair of sliding shoes 8, arranged, respectively, upon opposite sides of the flat fulcrum-bar and provided at their upper and lower edges with the inturned guard-flanges 9, projecting over the top and bottom edges of the fulcrum-bar to guide the shoes and hold the same against vertical displacement. The sliding shoes are properly retained in place and also adjusted through the medium of a clamp-bolt 10, connecting the opposite shoes and working in a guiding-slot 11, formed longitudinally in the fulcrum-bar. The active part of the buffer device referred to consists of friction-washers 12, interposed between the sliding shoes and the adjacent sides of the fulcrum-bar. Coupling-links 13 pivotally connect the opposite shoes 8 with the short arm S of the lever 2.

From the adjustment of the bolt 10 any desired amount of friction may be provided for in the buffer and also wear properly compensated for.

As exemplifying the range of modification that may be resorted to there is shown in Figs. 5 to 7, inclusive, a buffer device 3ª, which consists of a helical spring arranged about the fulcrum-bar and having a connection at one end with the coupling-links 13 and at its other end with the opposite supporting-arms 14 of a holding-bracket 15, formed rigidly with or upon the fulcrum-bar 1. Holding eyes or sleeves 16 are pivotally fitted to the arms 14 and to the links 13 to provide for properly receiving the holding-spring 3ª.

In either form of the invention described it will be obvious that the buffer device will absorb and cushion the vibration or jar of the vehicle-body B, inasmuch as the checking-lever 2 has a direct pivotal connection 17 at its upper end with said body.

The antijouncing appliances described may be arranged in pairs or otherwise suitably disposed between the running-gear and the vehicle-body to provide for properly equalizing the spring action.

Having thus described my invention, what is claimed, and desired to be secured by Letters Patent, is—

1. An antijouncer for vehicles comprising a swinging fulcrum having a fixed point of attachment upon the running-gear of the vehicle and in the horizontal plane of the running-gear, a checking-lever pivotally connected with the vehicle-body, and a buffer device arranged to constitute a coupling connection between the fulcrum and the checking-lever.

2. An antijouncer for vehicles comprising a fulcrum-bar having a fixed pivotal support at one end, a vertically-swinging checking-lever pivotally mounted upon the opposite end of the fulcrum-bar and also connected with the vehicle-body, and a buffer device embracing the fulcrum-bar and connected to the checking-lever, as described.

3. An antijouncer for vehicles, comprising a swinging fulcrum-bar having a fixed pivotal support at one end, a bell-crank checking-lever connected at one end with the vehicle-body and at its angle to the fulcrum-bar, and a buffer device comprising a member mounted upon the fulcrum-bar and pivotally coupled to the short arm of said lever.

4. An antijouncer for vehicles, comprising a fulcrum-bar having a fixed pivotal support at one end, a bell-crank checking-lever connected at one end with the vehicle-body and at its other end to the fulcrum-bar, a buffer device comprising sliding shoes disposed at opposite sides of the fulcrum-bar and friction-washers between said shoes and the bar, and link connections between said shoes and the short arm of the checking-lever.

5. An antijouncer for vehicles comprising a fulcrum-bar having a fixed pivotal support at one end, a bell-crank checking-lever connected at one end with the vehicle-body and at its other end to the fulcrum-bar, a buffer device comprising sliding shoes disposed at opposite sides of the fulcrum-bar and friction-washers between said shoes and the bar, and link connections between said shoes and the short arm of the checking-lever, and means for retaining the sliding shoes on the fulcrum-bar and also for regulating the amount of friction between the buffer device and the fulcrum-bar.

FRED A. LAW.

Witnesses:
H. A. CHAPIN,
K. I. CLEMONS.